(12) United States Patent
Rojas et al.

(10) Patent No.: US 10,814,206 B2
(45) Date of Patent: Oct. 27, 2020

(54) METHOD AND SYSTEM FOR AUTHENTICATING GOLF SCORES

(71) Applicants: Raul Rojas, Miami, FL (US); Jose Torbay, Coral Gables, FL (US)

(72) Inventors: Raul Rojas, Miami, FL (US); Jose Torbay, Coral Gables, FL (US)

(*) Notice: Subject to any disclaimer, the term of this patent is extended or adjusted under 35 U.S.C. 154(b) by 63 days.

(21) Appl. No.: 16/222,445

(22) Filed: Dec. 17, 2018

(65) Prior Publication Data

US 2019/0192951 A1 Jun. 27, 2019

Related U.S. Application Data

(60) Provisional application No. 62/609,363, filed on Dec. 22, 2017.

(51) Int. Cl.
| | | |
|---|---|---|
| *A63B 71/06* | (2006.01) | |
| *G06F 21/64* | (2013.01) | |
| *G06Q 10/10* | (2012.01) | |
| *A63B 102/32* | (2015.01) | |

(52) U.S. Cl.
CPC ...... *A63B 71/0605* (2013.01); *A63B 71/0669* (2013.01); *G06F 21/64* (2013.01); *G06Q 10/10* (2013.01); *A63B 2102/32* (2015.10)

(58) Field of Classification Search
USPC .......................................................... 700/92
See application file for complete search history.

(56) References Cited

U.S. PATENT DOCUMENTS

2005/0096761 A1* 5/2005 Hanover, Jr. .......... A63B 71/06
700/92

* cited by examiner

*Primary Examiner* — Pierre E Elisca
(74) *Attorney, Agent, or Firm* — Andrew Morabito

(57) ABSTRACT

The present invention disclosed a method, system, and computer product for authenticating a golf score, the method comprising; receiving, by one or more processors, a score, wherein the score is associated with a first party, publishing, by one or more processors, the score, receiving, by one or more processors, an authentication request for the score, determining, by one or more computing device, if the score is submitted by the first party, wherein if the authentication request is submitted by the first party the score is not authenticated and the authentication request is determined to be from a second party, verifying, by one or more processors the second party, authenticating, by one or more processors, the score, wherein the second party is verified, and calculating, by one or more processors, a calculated score.

18 Claims, 4 Drawing Sheets

METHOD AND SYSTEM FOR AUTHENTICATING GOLF SCORES

BACKGROUND

This disclosure relates generally score authentication, and more specifically to a method, computer program and computer system that is used to authenticate scores from a round of golf by preapproved parties.

Golf is a game with a rich history spanning more than 100 years and is enjoyed by men and women of virtually all ages. Throughout the entire history of golf, forms of competition have existed between golfers, which value various elements or combinations of the golfer's score to determine a result. Golf is a very popular sport enjoyed by many people worldwide on a regular basis. Golf may be played individually, in small groups, in large golf events, or tournaments. Whether played individually or in groups, every golfer typically utilizes a scorecard to record their scores. Golfers often arrange to play in groups of more than four individuals, requiring the players to separate into different playing groups with 2-6 (usually 4 if possible) individual golfers in any one playing group, or a number of golfers in a playing group allowed by the golf course and deemed appropriate by the group. As a result, scorecards are distributed to every player or placed on every golf cart used for a round of golf. After the round of golf, all of the score cards must be collected to transfer the scores to a leaderboard or display. Each play then needs to input their score into an online database to further adjust their handicap. This can be a very time-consuming endeavor and can also be very problematic when a score card is lost, and by each player inputting their own score there is no authentication, and in some instances where other players in the group need to put in the other players scores, they do not upload the score.

While there are various devices and methods currently known for allowing golfers to record scores, such systems fail to take into consideration the aforementioned problems. As such, there is a need in the art for an improved golf scoring system to allow golfers to utilize a reusable scorecard which provides or simple calculation and recordation of golf scores.

Therefore, it is desired for a method, computer program, or computer system where a golfer can input their own score, and preapproved parties can authentic the golfer's score through an easy to navigate and operate

SUMMARY

The present invention is directed generally towards reviewing and attesting golf scores for the purpose of authenticating a player's handicap with verified scores. In a first embodiment, the present invention is a method for authenticating a golf score, the method comprising: receiving, by one or more processors, a score, wherein the score is associated with a first party; publishing, by one or more processors, the score; receiving, by one or more processors, an authentication request for the score; determining, by one or more processor, if the score is submitted by the first party, wherein if the authentication request is submitted by the first party the score is not authenticated and the authentication request is determined to be from a second party; verifying, by one or more processors the second party; authenticating, by one or more processors, the score, wherein the second party is verified; and calculating, by one or more processors, a calculated score.

In a second embodiment, the present invention is a computer system for authenticating a golf score, the computer system comprising: one or more computer processors, one or more computer readable storage media, and program instructions stored on the one or more computer readable storage media for execution by, at least one of the one or more processors, the program instructions comprising: program instructions to receive a score, wherein the score is associated with a first party; program instructions to publish the score; program instructions to receive an authentication request for the score; program instructions to determine if the score is submitted by the first party, wherein if the authentication request is submitted by the first party the score is not authenticated and the authentication request is determined to be from a second party; program instructions to verify the second party; program instructions to authenticate the score, wherein the second party is verified; and program instructions to calculate a calculated score.

In a third embodiment, the present invention is a computer program product for authenticating a golf score, the computer program product comprising: one or more computer readable storage media and program instructions stored on the one or more computer readable storage media, the program instructions comprising: program instructions to publish the score; program instructions to receive an authentication request for the score; program instructions to determine if the score is submitted by the first party, wherein if the authentication request is submitted by the first party the score is not authenticated and the authentication request is determined to be from a second party; program instructions to verify the second party; program instructions to authenticate the score, wherein the second party is verified; and program instructions to calculate a calculated score.

Figure 1:
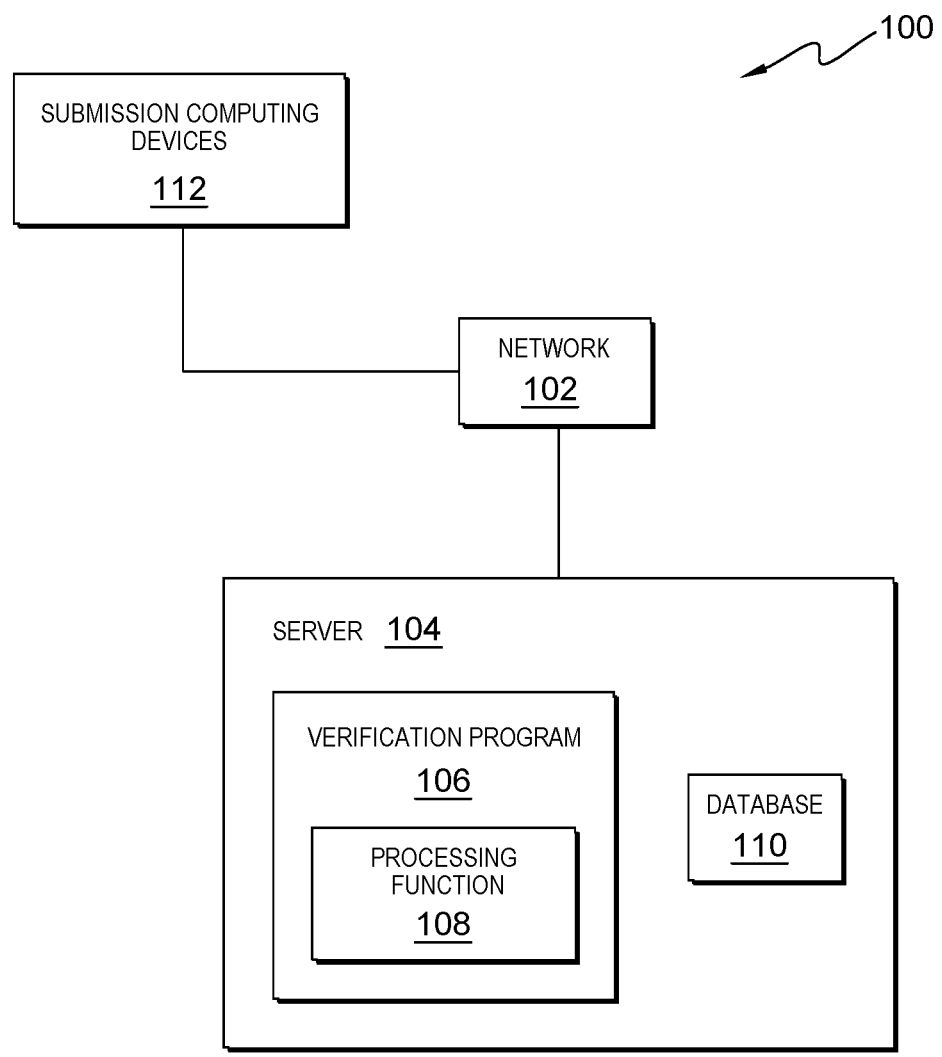
FIG. 1 depicts a block diagram depicting a computing environment, in accordance with one embodiment of the present invention.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

The system, method, or computer program product is able to receive a score and based on authenticating or attesting to the score, calculating a handicap or authenticated score. The program is able to analyze the people attesting to the score to verify that they witness or are eligible to attest to the score.

The present invention will now be described in detail with reference to the Figures.

FIG. 1 depicts a block diagram depicting a computing environment 100, in accordance with one embodiment of the present invention. FIG. 1 provides an illustration of one embodiment and does not imply any limitations regarding the environment in which different embodiments maybe implemented. In the depicted embodiment, computing environment 100 includes network 102, server 104, and submission computing device 112. Computing environment 100 may include additional servers, computers, or other devices not shown.

Network 102 may be a local area network (LAN), a wide area network (WAN) such as the Internet, any combination thereof, or any combination of connections and protocols that can support communications between server 104, submission computing device 112 in accordance with embodiments of the invention. Network 102 may include wired, wireless, or fiber optic connections. The network 102 can include links using technologies such as Ethernet, 802.11, worldwide interoperability for microwave access (WiMAX), 3G, 4G, 5G, CDMA, GSM, LTE, digital subscriber line (DSL), etc. Similarly, the networking protocols used on the network 102 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 102 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

Submission computing device 112 may be a management server, a web server, or any other electronic device or computing system capable of processing program instructions and receiving and sending data. In some embodiments, submission computing device 112 may be a laptop computer, tablet computer, netbook computer, personal computer (PC), a desktop computer, phone, smart phone, or any programmable electronic device capable of communicating with server 104 via network 102. In other embodiments, submission computing device 112 may represent a server computing system utilizing multiple computers as a server system, such as in a cloud computing environment. In another embodiment, submission computing device 112 represents a computing system utilizing clustered computers and components to act as a single pool of seamless resources. In the depicted embodiment, submission computing device 112 includes Verification program 106, processing function 108, and database 110. In other embodiments, submission computing device 112 may include any combination of Verification program 106, processing function 108, and database 110. Submission computing device 112 may include components, as depicted and described in further detail with respect to FIG. 4.

Server 104 may be a management server, a web server, or any other electronic device or computing system capable of processing program instructions and receiving and sending data. In another embodiments server 104 may be a laptop computer, tablet computer, netbook computer, personal computer (PC), a desktop computer, phone, smart phone, or any programmable electronic device capable of communicating via network 102. In one embodiment, server 104 may be a server computing system utilizing multiple computers as a server system, such as in a cloud computing environment. In one embodiment, server 104 represents a computing system utilizing clustered computers and components to act as a single pool of seamless resources. In the depicted embodiment database 110 is located on server 104. Server 104 may include components, as depicted and described in further detail with respect to FIG. 4.

Verification program 106 operates to receive and authenticate a score, verify the submitter, and processing the data received. In the depicted embodiment, Verification program 106 utilizes network 102 to access the server 104 and communicates with database 110. In one embodiment, Verification program 106 resides on submission computing device 112. In other embodiments, Verification program 106 may be located on another server or computing device, provided Verification program 106 has access to database 110, and processing function 108.

Processing function 108 operates to receive, analyze, categorize, and authenticate the scores inputs, and to verify the identity status of the submitter. In the depicted embodiment, processing function 108 is a function of Verification program 106. In other embodiments, processing function 108 may be a stand-alone program located on another server, computing device, or program, provided processing function 108 has access to database 110.

Database 110 may be a repository that may be written to and/or read by Verification program 106, processing function 108. Information gathered from structured data source 110 and/or unstructured data source 112 may be stored to database 110. Such information may include previous scores, submitters verification, submitters identity, locations, dates, events, and contact information. In one embodiment, database 110 is a database management system (DBMS) used to allow the definition, creation, querying, update, and administration of a database(s). In the depicted embodiment, database 110 resides on submission computing device 112. In other embodiments, database 110 resides on another server, or another computing device, provided that database 110 is accessible to Verification program 106 and processing function 108.

Figure 2:
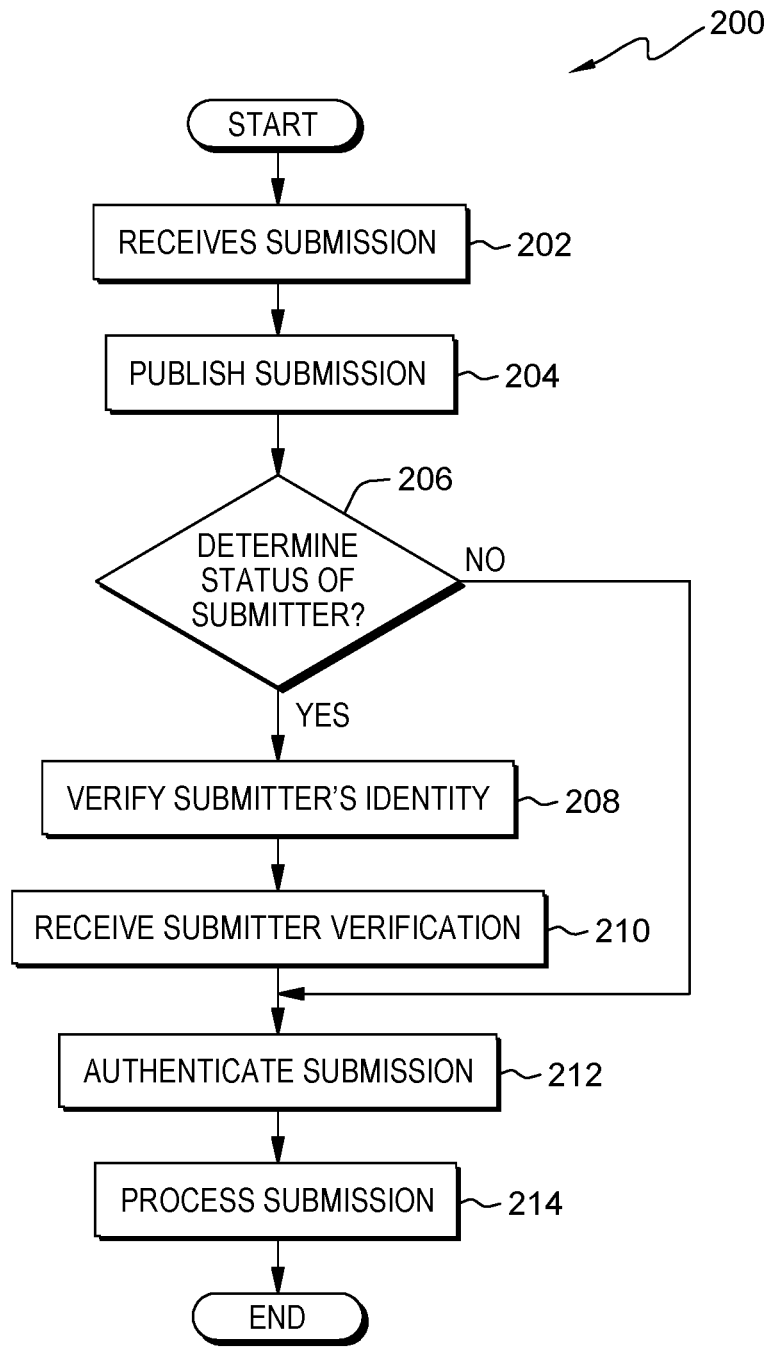
FIG. 2 depicts a flowchart of the operational steps taken by a verification program to verify a score while using a computing device within the computing environment of FIG. 1, in accordance with an embodiment of the present invention.

FIG. 2 depicts a flowchart of the operational steps taken by verification program 106 to authenticate a score while using a computing device within the computing environment of FIG. 1, in accordance with an embodiment of the present invention. It should be appreciated that there can be additional, fewer, or alternative steps performed in similar or alternative orders, or in parallel, in accordance with the various embodiments discussed herein unless otherwise stated. The method(s) and associated process(es) are now discussed, over the course of the following paragraphs, with extensive reference to FIG. 2, in accordance with one embodiment of the present invention. The purpose of the process(es) performed are to gather the relevant user information to properly interact with the cause based on the petition requirements.

The verification program 106 is used to gather scores submitted by golfers as well as additional information related to the round of golf. This allows the proper parties to authenticate or attest to the score so that the verification program 106 can calculate a handicap for the golfer based on both the authenticated scores as well as a non-authenticated handicap.

In the embodiments described below, golf will be used. However, in various other embodiments, various sports or events where scores need to be attested to may use the system, method, or computer program product disclosed below.

In step 202, the processing function 108 receives a submission. The submission may be, in the form of a score for a round of golf, or various other sporting events wherein a score need to be attested. The submission maybe for a person submitting a personal score, a score of another player, or a third-party score. In some embodiments, the score may be submitted independent of any additional information. In some embodiments, the score is submitted with additional information. This additional information may be, but not limited to, the date the event took place, the course name, the course location, the other members or participants in the event, witnesses, or the like. The witnesses may be managers of the course, people which were with the group playing but were not playing, or tournament or competition personnel, and the like.

The golfer may input the course name, the time of the round, the names and information related to the other golfers in the group, witnesses, location (e.g. using global positioning system technology) or additional information which would assist in identifying the round of golf. This information allows the processing function 108 to identify other score submissions, other golfers identify and assist in processing the authentication of the score. For example, when a golfer inputs his score and the name of the other golfers in the group, the course, and the start time, the processing function 108 is able to search and locate the other golfers to authenticate the score by providing them with notifications or information of the submitted score. In some embodiments, the processing function 108 is able to populate information related to the score from the information received from the submission computing device, e.g. global positioning system, clock, and calendar functions. In some embodiments, the processing function 108 is able to associate a score submitted with inadequate information, based on additional submitted scores. In some embodiments, the golfer may submit a score and the tournament personal to request to authenticate the score.

In some embodiments, the submitter is able to submit direct requests to have submissions authenticated by predetermined users. For example, if the golfer submits his score, he can send a request to the other golfers in the party to authenticate his score.

In step 204, the processing function 108 publishes the submission. The score is published to allow for the public to access the score through various electronic devices depicted in FIG. 1. In some embodiments, the score is published with the associated data, such as, but not limited to the course, date, time, and the like. This associated data may be provided with the submission. In some embodiments, the associated information is gathered through various programs, functions, web crawling services, or artificial intelligence, neural network, deep learning, reinforcement learning, Bayesian learning, or a combination thereof. In some embodiments, the submission remains open for a predetermined time period. In additional embodiments, the score remains open for an indefinite time period.

In some embodiments, when a submission is made, the processing function 108 gathered data from the device, such as, but not limited to location (through global positioning systems), time, and the like to determine the associated data.

In determination 206, the processing function 108 determines the status of the submitter. The submitter may be person or entity which initially submits the submission or may be a person or entity which is responding to the publication of the submission. The processing function 108, determines if the person or entity submitting the score is the person who produced that score or a third party. For example, in golf, the person who shot the score may submit their score, or a third party (e.g. a golfer who played with the submitted, a spectator, a judge or referee, or arbitrary person). Through either knowledge of the account holder, a questionnaire, or additional verification methods, the processing function 108 determines if the submitter is the one who produced the score. In golf, the person is unable to authenticate or attest to their own score, so a person who witnessed the round of golf (e.g. officiant, other golfer in group, or a witness) is needed to attest the score If the processing function 108 determines that the submitter is not approved to verify the submission (YES branch, proceed to step 110), the processing function 108 requests authentication by a verified submitter. If the processing function 108 determines that the submitter is verified to authenticate the submission (NO branch, proceed to step 108) the processing function 108 authenticates the submission.

In some embodiments, the submitter is preapproved based on predetermined factors. For example, the submitter may have been in the group playing or be a preapproved party (e.g. official) and is able to automatically authenticate a score. In some embodiments, the processing function 108 requires only one form of authentication of a score to determine that the score has been authenticated. In additional embodiments, the processing function 108 requires more than one authentication to determine if the score has been authenticated. In some embodiments, the third party needs to be a preapproved party based on predetermined conditions.

In some embodiments, the processing function 108 is able to simultaneously authenticate a score based on submission parameters. For example, during a tournament where there is at least one submitter who is preapproved to authenticate submissions, the scores are automatically authenticated and do not require the determine of the status of the submitter.

In step 208, the processing function verifies the submitter's identity. This process if further explained in FIG. 3. The verification process of the submitters may be based on the status of the submitter, the submitters profile, or previously gathered data. In additional embodiments the status of the submitter is gathered through various programs, functions, web crawling services, or artificial intelligence, neural network, deep learning, reinforcement learning, Bayesian learning, or a combination thereof. For example, if a submitter had previously submitted authentication for the owner of the submission, the processing function 108 is able to determine the previous authentication of the submitter and automatically process the authentication.

In step 210, the processing function 108 receives the verification of the submitter. Once the processing function 108 receives verification of the submitter either through the verification process, an automatic verification, or a third-party input, the processing function 108 is able to authenticate the submission.

In step 212, the processing function 108 authenticates the submission. Through previous verification of the submitter or pre-assumption of the submitter being verified, the submission is authenticated. The processing function 108 authenticates the submission. The authentication process alters the status of the submission from an unauthenticated version or status to an authenticated version or status. This allows for additional processing of the submission by the processing function 108.

In additional embodiments, the authenticated submissions are presented in an alternative method than non-authenticated submissions. For example, an authenticated submission may have various identifiers (e.g. markings, alterations to text, location, color, etc.) to distinguish the authenticated submission from the non-authenticated submission. The processing function 108 identifies the authenticates submissions. The identifying of the authenticates submissions allows the viewers to be able to easily distinguish the submissions, and also provide a visual identification as to which submissions till need to be authenticated.

In step 214 the processing function 108 processes the submission. The processing function 108 calculates the score associated with the received submission and the previously received submissions associated with that golfer/player. In some embodiments, this include all authenticated submissions, all non-authenticated submissions, or a combination of authenticated or non-authenticated submissions. The processing of the submission(s) is used to calculate the handicap or value used to identify the player or golfer for future events. In some embodiments, the handicap is calculated based on all received scores, and wherein a percentage of the received scores that are attested to are identified. For example, where 10 scores are submitted by a golfer and 7 are attested to, the handicap calculation comprises the 10 scores and is 70% attested to. In additional embodiments, the handicap is calculated based on the attested scores. For example, where 10 scores are submitted by a golfer and 7 are attested to, the handicap calculation comprises the 7 attested scores. In some embodiments, both handicaps are provided In some embodiments, the processing function 108 is able to associate submissions and provide predetermined users with submission requests. Where adequate information is able to determine various submissions are associated, the processing function 108 is able to automatically authenticate the submission. For example, if four golfers submit their own personal scores, and adequate information is present to determine that the four golfers were in the same group, if one of the scores is authenticated, the processing function 108 may send a direct request to authenticate the other scores in the group to the other players or to the one player which authenticated the one score.

Once the submission is authenticated, a notification is sent to the player to notify them that their score has been authenticated, the modification to their handicap, or the update to their account history.

Figure 3:
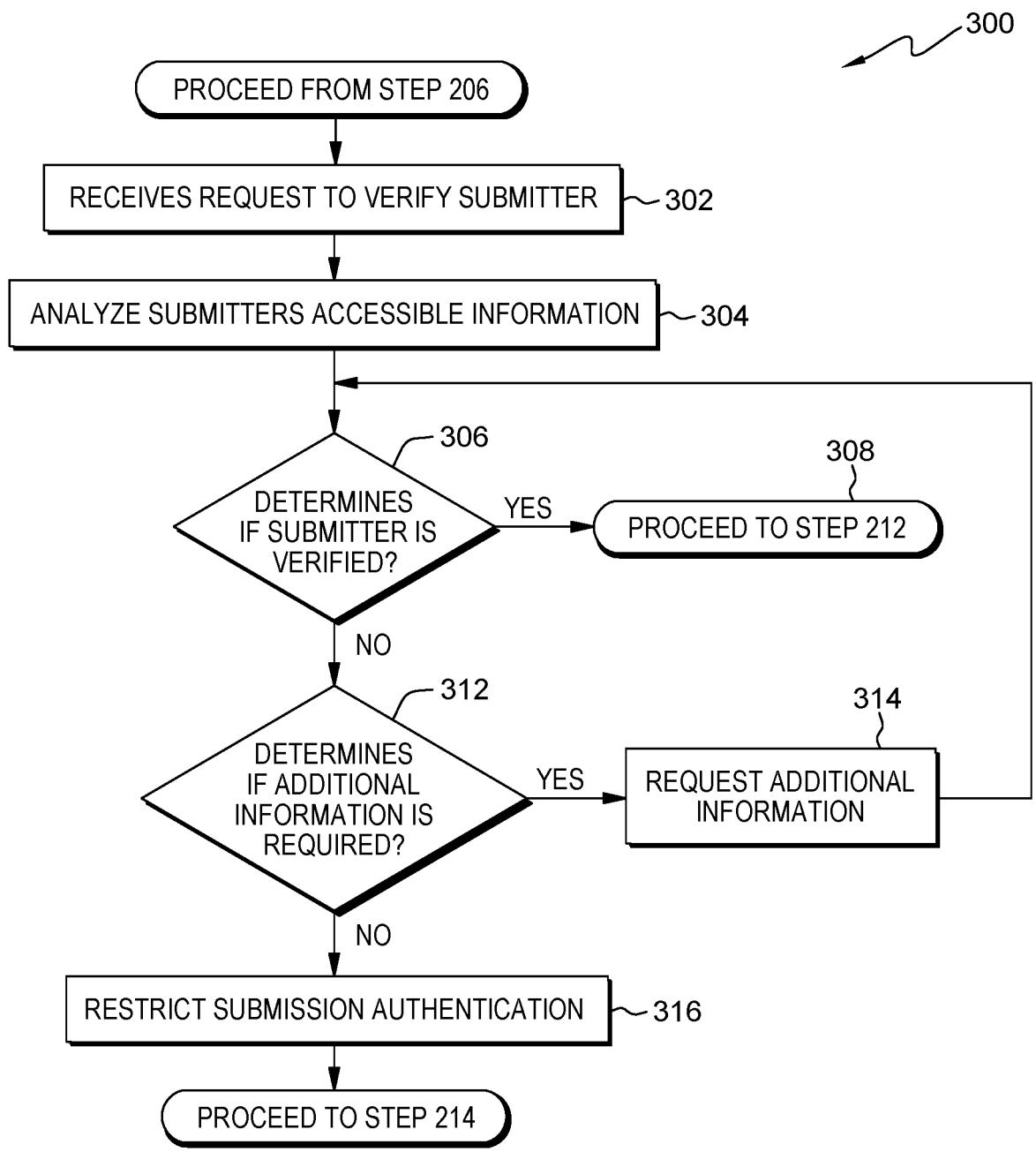
FIG. 3 depicts a flowchart of the operational steps taken by the verification program to verify the submitter while using a computing device within the computing environment of FIG. 1, in accordance with an embodiment of the present invention.

FIG. 3 depicts a flowchart of the operational steps taken by verification program 106 to verify the submitter while using a computing device within the computing environment of FIG. 1, in accordance with an embodiment of the present invention. It should be appreciated that there can be additional, fewer, or alternative steps performed in similar or alternative orders, or in parallel, in accordance with the various embodiments discussed herein unless otherwise stated. The method(s) and associated process(es) are now discussed, over the course of the following paragraphs, with extensive reference to FIG. 2, in accordance with one embodiment of the present invention. The purpose of the process(s) performed are to gather the relevant user information to properly interact with the cause based on the petition requirements.

In step 302, the processing function 108 receives the request to verify the submitter. This request is received from step 206 in FIG. 2. In some embodiments, the submitters are only members of the service. In additional embodiments, various third parties are able to submit scores to the verification program 106.

In step 304, the processing function 108 analyzes the submitters accessible information. Associated with each submitter is an account, wherein the submitter provides relevant information related to the individual associated with the account. The processing function 108 accesses this information, which may include, but is not limited to the name, age, location, association with submission, status, position, calendar, schedule, and various other characteristics which can be used to verify the submitter. In some embodiments, the processing function 108 access database 108 to locate previously verified submitter's accounts to determine if the submitter has previously been verified.

In determination 306, the processing function 108 determines if the submitter is verified. The processing function 108, determines if the submitter is verified based on the accessible information. For example, if the processing function 108 can determine that the submitter is not the golfer which produced the score and witnesses the round of golf, the processing function 108 is able to determine that the person authenticating the score is verified. If the processing function 108 determines that the submitter is verify (YES branch, proceed to step 110), the processing function 108 proceeds to step 112. If the processing function 108 cannot determine if the submitter is verified based on the accessible information (NO branch, proceed to step 108) the processing function 108 determines if additional information is required to verify the submitter.

In determination 308, the processing function 108 determines if additional information is required to verify the submitter. The processing function 108 may require additional information to verify the submitter based on the accessible information. For example, if the submission is coming from a user who does not have an account, the processing function 108 does not have access to their information to determine if they were present to witness the round of golf. Therefore, the processing function 108 requires additional information to verify the submitter. If the processing function 108 determines that additional information is required (YES branch, proceed to step 110), the processing function 108 requests additional information. If the processing function 108 determines that additional information is not required (NO branch, proceed to step 108) the processing function 108 restricts the authentication of the submission. This event typically happens when a submitter is also the person whom the submission is associated with. E.g. the golfer is trying to authenticate their own score.

In step 314, the processing function 108 requests additional information. This additional information may be in the form of a questionnaire, the creation of an account, or the like. The additional information is specific to either information not present from the initial analysis, or information required to process the authentication of the submission. For example, with the authentication of a golf score, knowledge that the submitter witnesses the round of golf is adequate to authenticate the submission. In other instances, more information may be required.

In step 316, the processing function 108 restricts the submission authentication. In some embodiments, this keeps the submission in a non-authenticated state. In additional embodiments, the submission is marked. The restriction of the authentication does not hinder other submitters from attempting to authenticate the submission.

Figure 4:
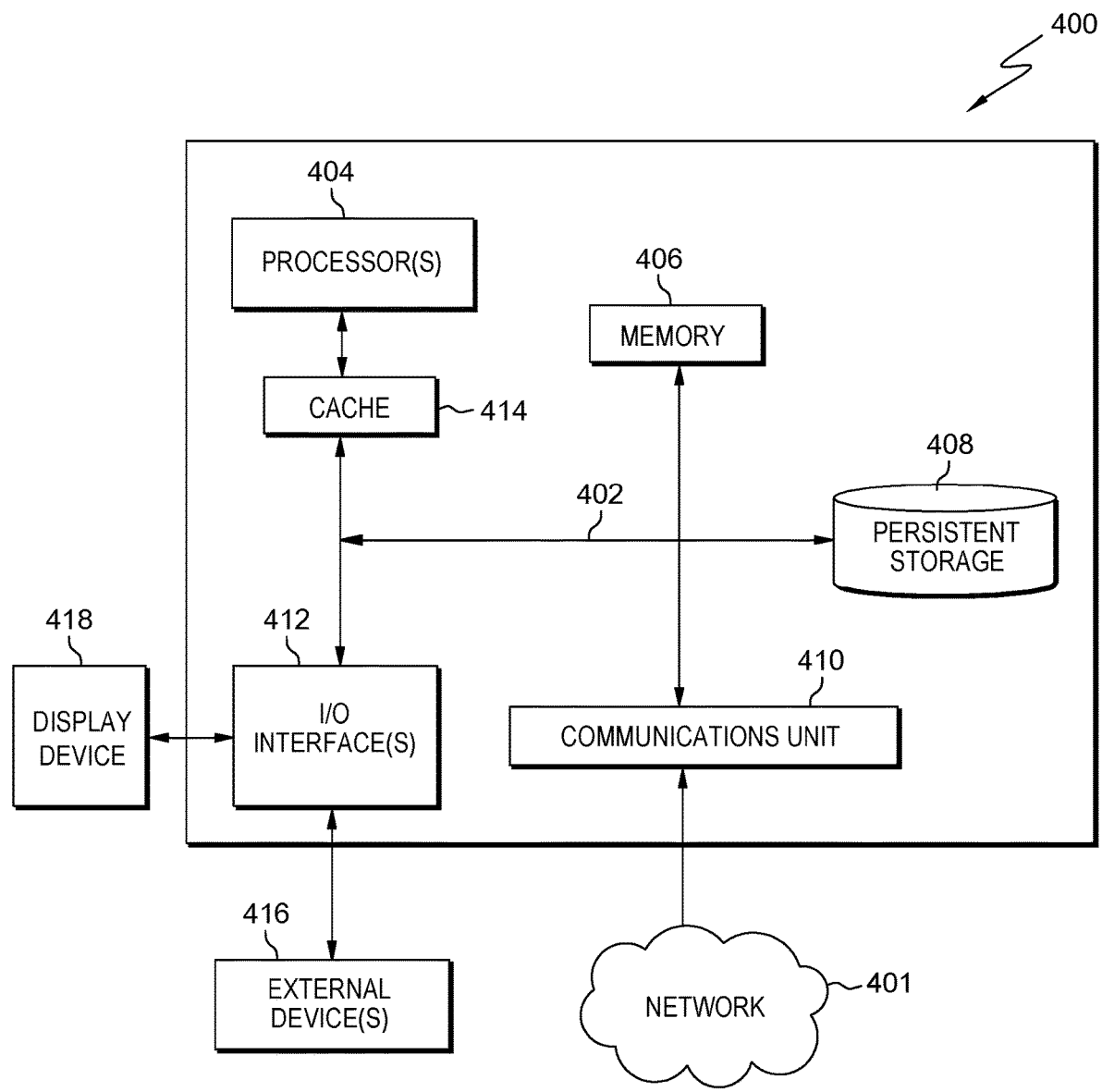
FIG. 4 depicts a block diagram depicting the internal and external components of the server of FIG. 1, in accordance with one embodiment of the present invention.

FIG. 4 depicts a block diagram 400 depicting the internal and external components of the server 104 of FIG. 1, in accordance with one embodiment of the present invention. FIG. 4 depicts a block diagram 400 of components of a computing device (e.g. submission computing device 112 or server 104), in accordance with an illustrative embodiment of the present invention. It should be appreciated that FIG. 1 provides only an illustration of one implementation and does not imply any limitations with regard to the environments in which different embodiments may be implemented. Many modifications to the depicted environment may be made. It should be appreciated FIG. 1 provides only an illustration of one implementation and does not imply any limitations with regard to the environments in which different embodiments may be implemented.

Computing environment 400 is, in many respects, representative of the various computer subsystem(s) in the present invention. Accordingly, several portions of computing environment 400 will now be discussed in the following paragraphs.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any additional hardware components within a system. For example, communications fabric 402 can be implemented with one or more buses.

Computing device 400 is capable of communicating with other computer subsystems via network 401. Network 401 can be, for example, a local area network (LAN), a wide area network (WAN) such as the Internet, or a combination of the two, and can include wired, wireless, or fiber optic connections. In general, network 401 can be any combination of connections and protocols that will support communications between computing device 400 and other computing devices.

Memory 406 and persistent storage 408 are computer-readable storage media. In one embodiment, memory 406 includes random access memory (RAM) and cache memory 414. In general, memory 406 can include any suitable volatile or non-volatile computer-readable storage media.

Memory 406 is stored for execution by one or more of the respective computer processors 404 of computing device 400 via one or more memories of memory 406 of computing device 400. In the depicted embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in the examples, provides for communications with other data processing systems or devices, including computing device 400. In the examples, communications unit 410 includes one or more network interface cards. Communications unit 410 may provide communications through the use of either or both physical and wireless communications links.

I/O interface(s) 412 allows for input and output of data with other devices that may be connected to computing device 400. For example, I/O interface 412 may provide a connection to external devices 416 such as a keyboard, keypad, camera, a touch screen, and/or some other suitable input device. External devices 416 can also include portable computer-readable storage media such as, for example, thumb drives, portable optical or magnetic disks, and memory cards. Software and data used to practice embodiments of the present invention, e.g., regulation program 420 can be stored on such portable computer-readable storage media and can be loaded onto persistent storage 408 of computing device 400 via I/O interface(s) 412 of computing device 400. Software and data used to practice embodiments of the present invention, e.g., regulation program 420 can be stored on such portable computer-readable storage media and can be loaded onto persistent storage 408 of computing device 400 via I/O interface(s) 412 of computing device 400. I/O interface(s) 412 also connect to a display 418.

Display 418 provides a mechanism to display data and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computing devices, partly on the computing devices, as a stand-alone software package, partly on the computing device or server and partly on a remote computer or entirely on the remote computer or server. In the latter scenario, the remote computer may be connected to the computing devices through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

What is claimed is:

1. A method for authenticating a golf score, the method comprising:
receiving, by one or more processors, a score, wherein the score is associated with a first party;
publishing, by one or more processors, the score;
receiving, by one or more processors, an authentication request for the score;
determining, by one or more processor, if the score is submitted by the first party, wherein if the authentication request is submitted by the first party the score is not authenticated and the authentication request is determined to be from a second party;
verifying, by one or more processors the second party;
authenticating, by one or more processors, the score, wherein the second party is verified; and
calculating, by one or more processors, a calculated score.

2. The method for authenticating a golf score of claim 1, further comprising, identifying, by one or more processors, the authenticated score, wherein the authenticated score is visually identified differently than a non-authenticated score.

3. The method for authenticating a golf score claim 1, wherein the calculated score is comprised of authenticated and non-authenticated scores, further comprising, identifying, by one or more processors, the percentage of authenticated scores.

4. The method for authenticating a golf score of claim 1, wherein the verifying of the second party, further comprises, analyzing, by one or more processors, information associated with the second party.

5. The method for authenticating a golf score, of claim 4, wherein the analyzing of the information, further comprising determining if the information is adequate to verify the second party.

6. The method for authenticating a golf score of claim 5, further comprising, restricting, by one or more processors, the authentication of the submission of the second party if it is determined that the analyzed information is inadequate.

7. A computer system for authenticating a golf score, the computer system comprising:
one or more computer processors, one or more non transitory computer readable storage media, and program instructions stored on the one or more non transitory computer readable storage media for execution by, at least one of the one or more processors, the program instructions comprising:
program instructions to receive a score, wherein the score is associated with a first party;
program instructions to publish the score;
program instructions to receive an authentication request for the score;
program instructions to determine if the score is submitted by the first party, wherein if the authentication request is submitted by the first party the score is not authenticated and the authentication request is determined to be from a second party;
program instructions to verify the second party;
program instructions to authenticate the score, wherein the second party is verified; and
program instructions to calculate a calculated score.

8. The computer system for authenticating a golf score of claim 7, further comprising, program instructions to identify the authenticated score, wherein the authenticated score is visually identified differently than a non-authenticated score.

9. The computer system for authenticating a golf score claim 7, wherein the calculated score is comprised of authenticated and non-authenticated scores, further comprising, program instructions to identify the percentage of authenticated scores.

10. The computer system for authenticating a golf score of claim 7, wherein the verifying of the second party, further comprises, program instructions to analyze information associated with the second party.

11. The computer system for authenticating a golf score, of claim 10, wherein the analyzing of the information, further comprising program instructions to determine if the information is adequate to verify the second party.

12. The computer system for authenticating a golf score of claim 11, further comprising, program instructions to restrict the authentication of the submission of the second party if it is determined that the analyzed information is inadequate.

13. A computer program product for authenticating a golf score, the computer program product comprising:
one or more non transitory computer readable storage media and program instructions stored on the one or more non transitory computer readable storage media, the program instructions comprising:
program instructions to publish the score;
program instructions to receive an authentication request for the score;
program instructions to determine if the score is submitted by the first party, wherein if the authentication request is submitted by the first party the score is not authenticated and the authentication request is determined to be from a second party;
program instructions to verify the second party;
program instructions to authenticate the score, wherein the second party is verified; and
program instructions to calculate a calculated score.

14. The computer program product for authenticating a golf score of claim 13, further comprising, program instructions to identify the authenticated score, wherein the authenticated score is visually identified differently than a non-authenticated score.

15. The computer program product for authenticating a golf score claim 13, wherein the calculated score is comprised of authenticated and non-authenticated scores, further comprising, program instructions to identify the percentage of authenticated scores.

16. The computer program product for authenticating a golf score of claim 13, wherein the verifying of the second party, further comprises, program instructions to analyze information associated with the second party.

17. The computer system for authenticating a golf score, of claim 16, wherein the analyzing of the information, further comprising program instructions to determine if the information is adequate to verify the second party.

18. The computer program product for authenticating a golf score of claim 17, further comprising, program instructions to restrict the authentication of the submission of the second party if it is determined that the analyzed information is inadequate.

* * * * *